(12) United States Patent
Chang

(10) Patent No.: US 6,874,625 B2
(45) Date of Patent: Apr. 5, 2005

(54) SLIM TYPE STORAGE CASING FOR TWO PIECES OF OPTICAL DISKS

(75) Inventor: Chen-Cheng Chang, Taoyuan (TW)

(73) Assignee: CMC Magnetics Corporation, Taipei (TW)

(*) Notice: Subject to any disclaimer, the term of this patent is extended or adjusted under 35 U.S.C. 154(b) by 238 days.

(21) Appl. No.: 10/277,055

(22) Filed: Oct. 22, 2002

(65) Prior Publication Data

US 2003/0102233 A1 Jun. 5, 2003

(30) Foreign Application Priority Data

Nov. 30, 2001 (TW) .................................. 90220885 U

(51) Int. Cl.[7] .............................................. B65D 85/57
(52) U.S. Cl. ................................. 206/308.1; 206/310
(58) Field of Search .............................. 206/308.1, 309, 206/310, 311, 312, 313, 232

(56) References Cited

U.S. PATENT DOCUMENTS

| | | | | | |
|---|---|---|---|---|---|
| 5,799,782 A | * | 9/1998 | Gelardi | ..................... | 206/308.1 |
| 6,263,642 B1 | * | 7/2001 | Heiligers | ..................... | 53/445 |
| 6,283,282 B1 | * | 9/2001 | Wong et al. | ............. | 206/308.1 |
| 6,540,071 B2 | * | 4/2003 | Liu | ......................... | 206/308.1 |

FOREIGN PATENT DOCUMENTS

| | | |
|---|---|---|
| CN | 2406312 Y | 11/2000 |
| CN | 2418106 Y | 2/2001 |

* cited by examiner

Primary Examiner—Jacob K. Ackun, Jr.
(74) Attorney, Agent, or Firm—Rabin & Berdo P.C.

(57) ABSTRACT

A slim storage casing able to hold two optical disks. The upper and the lower casing each have a central straddling respectively formed at the time of molding, such that two optical disks, using the-center hole of the optical disk, can be coupled to the central straddling at the upper and the lower casing respectively and stored in the storage casing. The upper and the lower casing according to the invention has a thickness of about 5 mm to 5.5 mm when coupled together.

34 Claims, 4 Drawing Sheets

US 6,874,625 B2

SLIM TYPE STORAGE CASING FOR TWO PIECES OF OPTICAL DISKS

This application incorporates by reference the entire disclosure of of Taiwan application Serial No:90220885, Filed Nov. 30, 2001.

BACKGROUND OF THE INVENTION

1. Field of the Invention

The invention relates in general to a storage casing for the storage of two optical disks, and more particularly to a slim optical disk storage casing with a thickness of only 5 mm to 5.5 mm.

2. Description of the Related Art

The optical recording medium, with the advantages of huge memory, accurate recording of signals and lasting retention of data, has been widely used by ordinary consumers. As a consequence, development for the storage casing for optical recording medium is booming. Among varied optical recording media, let the optical disk here be used as an example. The most commonly used storage casing for an optical disk is a three piece storage casing which includes mainly a lower casing, an openable upper casing and a carriage tray installed at the chamber of the lower casing, wherein a central straddling and multi-footed retaining holders are situated at the center of the carriage tray. When retrieving an optical disk, the user matches the center of the optical disk and places it into the casing accordingly. When the user presses the button of the central straddling, the flexible retaining holders contract and the optical disk will be released.

Apart from a high manufacturing cost and time-consuming assembly, the abovementioned three piece type storage casing has a thickness of at least 10 mm due to the installment of the carriage tray which is several times that of an optical disk and is space-consuming in tenons of storage as well as transportation.

Recently, a slim type optical disk storage casing which is only half the thickness of the three piece type storage casing has come to the market. The two piece type storage casing, as is disclosed in Taiwanese patent publication number 417821 invented by the present inventor, reduces the thickness of the storage casing to about 5.2 mm without changing its original functions by eliminating the installment of a carriage tray.

However, such improvement still fails to meet consumers' needs to store their rapidly growing number of optical disks. Therefore, the invention aims to provide a storage casing which accommodates a maximum number of optical disks in a minimum space of room.

SUMMARY OF THE INVENTION

It is therefore an object of the invention to provide a slim type optical disk storage casing for two optical disks.

The storage casing according to the invention includes an upper casing and a lower casing. The upper casing further includes a U-shaped rear wall, a central straddling, a second outer wall, a third outer wall, a first protective rib, a second protective rib and a third protective rib; the lower casing includes a dual protruded arm, a central straddling, a first lateral wall, a fourth inner lateral wall, a fifth inner lateral wall, a first protective rib, a second protective rib and a third protective rib.

The upper casing and the lower casing match together through the pivotal coupling between the pivotal hole at the U-shaped rear wall and the protrusion point at the dual protruded arm forming a rotation axis X. The upper casing and the lower casing perform opposite rotating movement around the rotation axis X allowing the casing to be opened or closed accordingly. When the storage casing is closed, its thickness has a range between 5 mm and 5.5 mm and has a thickness of 5.2 mm in a preferred embodiment. The structure of the central straddling of the upper casing and the lower casing can be three flexible retaining holders or three flexible retaining holders alternating with three erected arced edges wherein the flexible retaining holders between the upper casing and the lower casing is not symmetric to the rotation axis X and the erected arced edge can be of equal or unequal height.

The flexible retaining holder according to the invention is an L-shaped structure with a standing protruded session and a lying protruded session which extends in the radiating direction either inwardly or outwardly. The standing protruded session of the flexible retaining holder can further include an outshoot situated atop at the side farther away from the center. The standing protruded session can also tilt in the direction away from the center. Furthermore, the standing protruded session of the flexible retaining holder not only tilts in the direction away from the center, the outshoot situated atop the standing protruded session at the side departing away from the center can also be found in a vertical protruded session.

As for the upper casing and the lower casing, a first protective rib and a second rib provide protection to the base of the optical disk preventing its base from contacting and rubbing with the storage casing which would cause damage to the data stored on the optical disk; the third protective rib provides protection to the top of the optical disk preventing the optical disk from being cracked or deformed by pressure coming from above directly. The casing can be made of appropriate materials and with suitable colors to prevent the optical disk from being exposed to sunshine directly which would damage the retention of the stored data.

The slim type storage casing for two optical disks according to the invention includes a paper tray cover whose upper cover forms a long narrow space with the U-shaped rear wall. The long narrow space can be used to accommodate an explanatory memorandum helping the user to locate the desired optical disk. The middle session of the first lateral wall of the lower casing is slightly concaved for the convenience of holding when the casing is to be opened, The second outer wall and the third outer wall of the upper casing match with the fourth inner lateral wall and the fifth inner lateral wall of the lower casing respectively through a pivot-matching mechanism using protrusion point and pivotal hole. Of these, the first lateral wall, the second outer lateral wall and its corresponding fourth inner lateral wall, the third outer lateral wall and its corresponding fifth inner lateral wall are all dustproof.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

Figure 1:
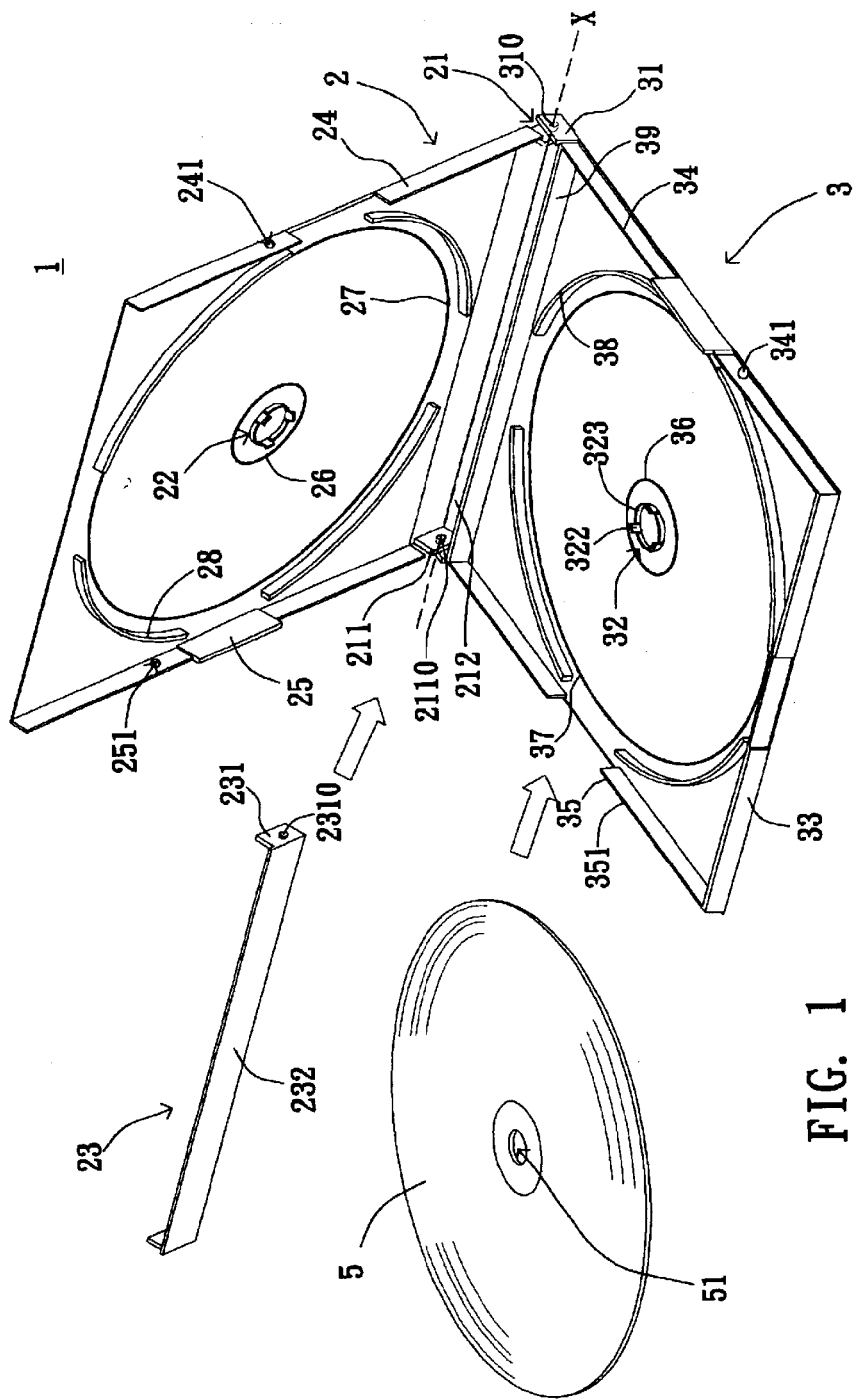
FIG. 1 illustrates a three dimensional view of the assembly of the storage casing according to the invention.

The invention provides a slim type optical disk storage casing for two optical disks. In this embodiment, an optical disk is used just as an example of a recording media. Referring first to FIG. 1, a three dimensional view of the assembly of the storage casing according to the invention is shown, wherein an optical disk 5 includes a center hole 51 whereas a storage casing 1 includes an upper casing 2 and a lower casing 3. Of these, the upper casing 2 includes a U-shaped rear wall 21, a central straddling 22, a second outer wall 24, a third outer wall 25, a first protective rib 26, a second protective rib 27 and a third protective rib 28; the lower casing includes a dual protruded arm 31, a central straddling 32, a first lateral wall 33, a fourth inner lateral wall 34, a fifth inner lateral wall 35, a first protective rib 36, a second protective rib 37 and a third protective rib 38. The upper casing 2 and the lower casing 3 according to the invention will have the abovementioned elements already as soon as the process of forming ejection (molding) is completed. The optical disk 5 is stored in the storage casing 51 using the coupling between the center hole 51 and the central straddling 22 and/or 32. So, the upper casing 2 and the lower casing 3 can each accommodate an optical disk respectively.

The U-shaped rear wall 21 of the upper casing 2 has two shorter edges 211 and a longer edge 212, wherein the shorter edge 211 of the U-shaped rear wall 21 has a pivotal hole 2110 while the dual protruded arm 31 of the lower casing 3 has a protrusion point 310. The upper casing 2 and the lower casing 3 according to the invention are assembled as a storage casing 1 through the pivotal matching between the protrusion point 310 of the dual protruded arm 31 and the pivotal hole 2110 at the shorter edge 211 of the U-shaped rear wall 21. After pivotal matching, the upper casing 2 and the lower casing 3 form a rotation axle (axis) X. The upper casing and the lower casing perform opposite rotating movement around the rotation axis X allowing the casing to be opened or closed accordingly. When closed, the storage casing according to the invention has a thickness ranging from 5 mm to 5.5 mm with comparison to a thickness of 5.2 mm in its preferred embodiment.

Figure 2A:
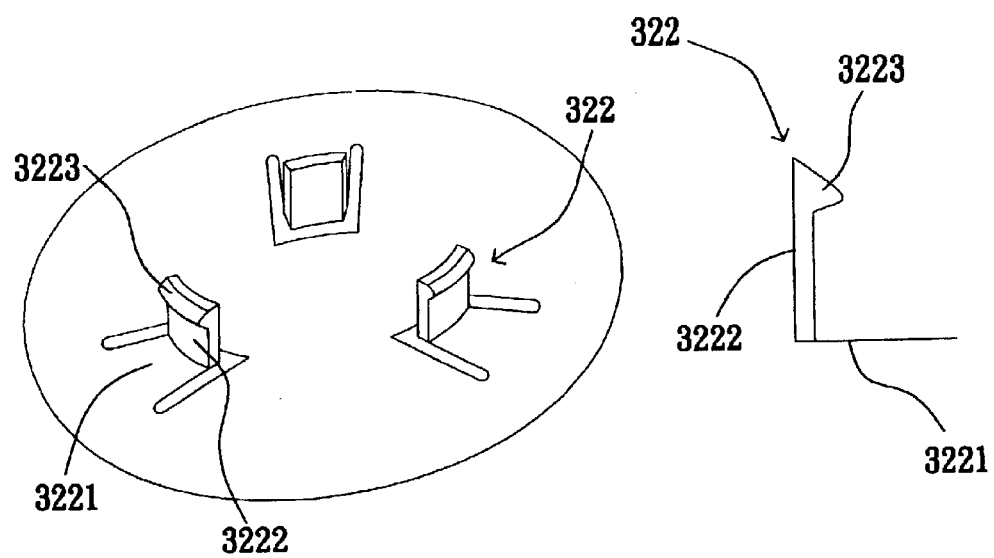
FIG. 2A illustrates the first embodiment of the central straddling according to the invention.

The central straddling 22 or 32 (the central straddling 32 will be used as an example hereinafter) according to the invention can be implemented using varied embodiments. FIG. 2A illustrates an enlargement of the first embodiment of the central straddling 32 according to the invention. The central straddling 32 comprises three flexible retaining holders 322. The left-hand part of FIG. 2A shows a three-dimensional drawing of the flexible retaining holder 322, whereas the right-hand part shows a side view of the flexible retaining holder 322. The flexible retaining holder 322 is an L-shaped structure with a lying protruded session 3221 and a standing protruded session 3222: the lying protruded session 3221 of the L-shaped structure extends along the central straddling 32 in an anti-radiating direction connecting and parall to the lower casing 3. The standing protruded session 3222 of the L-shaped structure can include an outshoot 3223 atop the standing protruded session 3222 at the side farther away from the center. The outshoot prevents the center hole 51 at the optical disk 5, which has been coupled to the central straddling 32, from being disconnected from the central straddling 32, which would cause damage to the optical disk 5 and its stored data. The flexible retaining holders at the upper casing and the flexible retaining holders at the lower casing are not symmetric according to (with respect to) the rotation axis X so that a storage casing according to the invention with a thickness between 5 mm and 5.5 mm can be achieved.

Figure 2B:
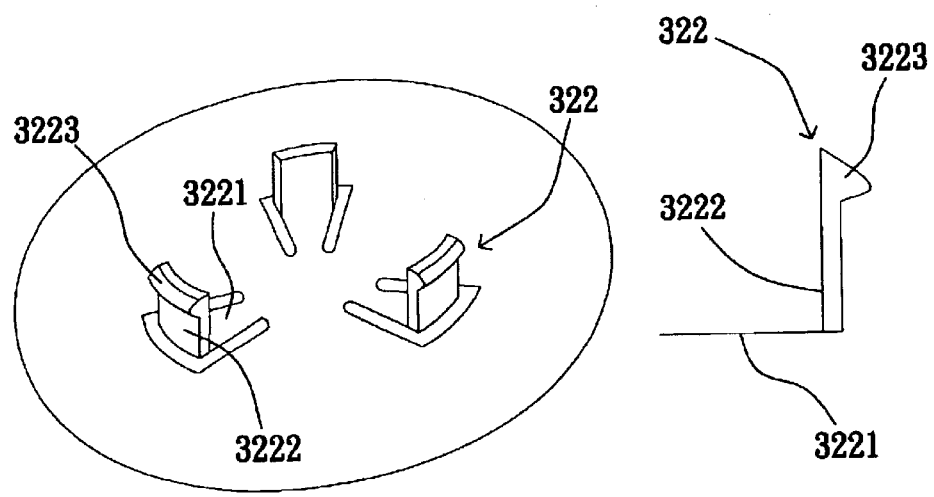
FIG. 2B illustrates the second embodiment of the flexible retaining holder according to the invention.

FIG. 2B illustrates an enlargement of a second embodiment of the flexible retaining holder 322 according to the invention. In the same way, the left-hand part of FIG. 2B shows a three-dimensional drawing of the flexible retaining holder 322, whereas the right-hand part shows a side view of the flexible retaining holder 322. What differs from the first embodiment in FIG. 2A is how the lying protruded session 3221 in the second embodiment extends along the radiating direction, with the outshoot 3223 still situated atop the standing protruded session at the side farther away from the center.

Figure 2C:
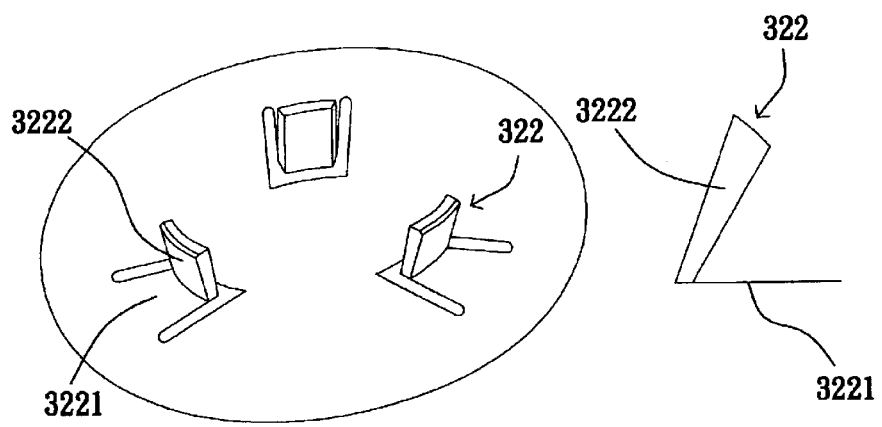
FIG. 2C illustrates the third embodiment of the flexible retaining holder according to the invention.
Figure 2D:
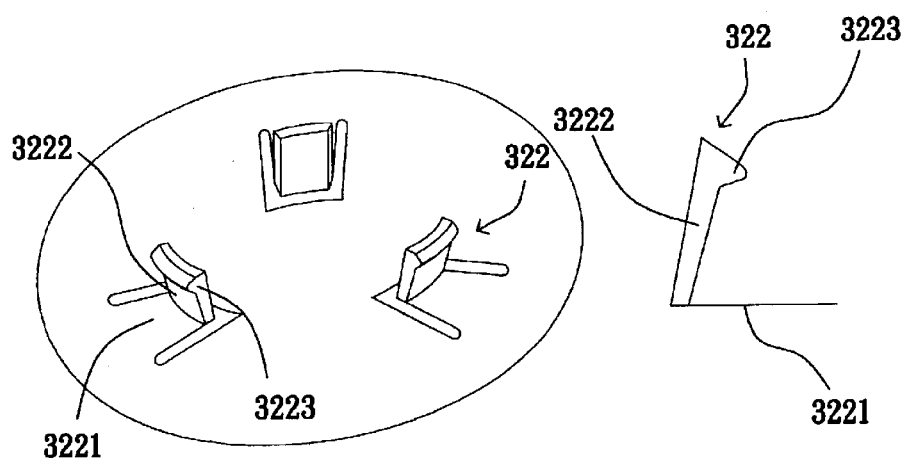
FIG. 2D illustrates the fourth embodiment of the flexible retaining holder according to the invention.

A similar mechanism preventing the optical disk from being disconnected, is shown in FIG. 2C and FIG. 2D. In FIG. 2C, the standing protruded session of the L-shaped structure tilts in the direction departing away from the center. In FIG. 2D, the standing protruded session of the L-shaped structure not only tilts in the direction departing away from the center, but is further equipped with a outshoot 3223 situated atop the standing protruded session at the side farther away from the center. As shown in FIG. 2C and FIG. 2D, the flexible retaining holder 322 can have a variation as shown in FIG. 2B, that is, the lying protruded session can extend along an anti-radiating direction.

Figure 3A:
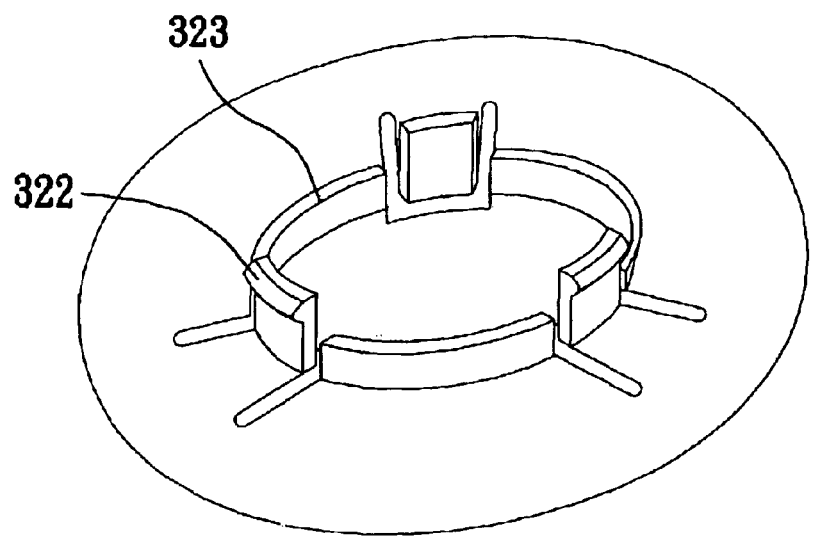
FIG. 3A illustrates another embodiment of the central straddling according to the invention.

Please refer to FIG. 3A, showing another embodiment of the central straddling 32 according to the invention. The central straddling 32 has three flexible retaining holders 322 and three erected arced edges 323 whose height is lower than that of the flexible retaining holder. The three flexible retaining holders 322 alternate with the three erected arced edges 323 such that a storage casing with a thickness ranging between 5 mm and 5.5 mm according to the invention can be achieved.

Figure 3B:
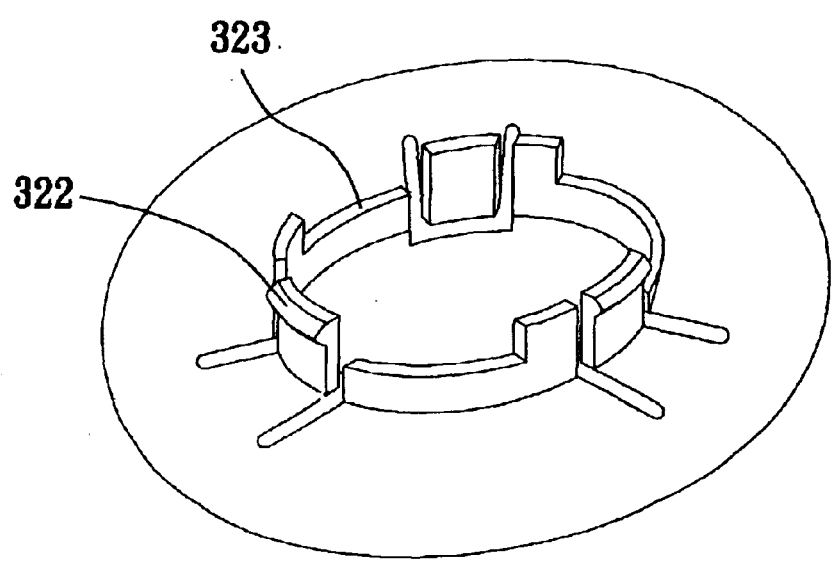
FIG. 3B illustrates another embodiment of the central straddling according to the invention.

Please refer to FIG. 3B, showing another embodiment of the central straddling 32 according to the invention. The central straddling 32 has three flexible retaining holders 322 and three erected arced edges 323 of unequal heights. The arc of the erected arced edges 323 is longer than that of the flexible retaining holder; the erected arced edges 323 alternate with the flexible retaining holders 322. Since the design of the flexible retaining holders 322 of the upper casing 2 and the lower casing 2 are not symmetric to the rotation axis X, the flexible retaining holders at the upper casing 2 match with the erected arced edges 323 at the lower casing 3 when the upper casing 2 and the lower casing 3 close together. The erected arced edges 323 here have a height ranging between 1.2 mm to 1.3 mm, while the erected arced edges 323 elsewhere have the same height with the flexible retaining holders 322, and vice versa, such that a storage casing with a thickness ranging between 5 mm and 5.5 mm according to the invention can be achieved. However, none of the above-mentioned embodiments of the central straddling 32 depart from the purpose to match the central straddling 32 at the upper casing 2 with the central straddling 32 at the lower casing 3 within an appropriate range of 5 mm to 5.5 mm when the upper casing 2 and the lower casing 3 are closed together. Therefore, any variations of central straddling made without deviating from the spirit of the invention are accorded in the scope of the invention.

Back to FIG. 1, a slim type storage casing for two optical disks according to the invention further includes a paper tray cover 23 with two shorter edges 231 and one longer edge 232. The paper tray cover 23 is compatible with the inventor's prior patent as disclosed in Taiwanese patent publication number 417821. The shorter edge 231 of the paper tray cover 23 has a protrusion point 2310 to pivotally match with a pivotal hole 2110 at the U-shaped rear wall 21. The longer edge 232 of the paper tray cover 23 is parallel to the upper casing 2. When the paper tray cover 23 and the U-shaped rear wall 21 combine together, a long narrow space will be formed which can be used to accommodate an explanatory memorandum helping the user to locate the desired optical disk or a piece of advertisement paper to promote the sale of the optical disk 5.

The lower casing 3 of the storage casing 1 further includes a second outer lateral wall 24 and a third outer lateral wall 25 which are perpendicular to the rotation axis X. The second outer lateral wall 24 has a pivotal hole 241 while the third outer lateral wall 25 has a pivotal hole 251. A gap exists in the middle session of the second outer wall 24. The lower casing 3 of the storage casing 1 includes a fourth inner lateral wall 34 and a fifth inner lateral wall which are perpendicular to the rotation axis X. The fourth inner lateral wall 34 corresponds (aligns) to the second outer lateral wall 24 while the fifth inner lateral wall 35 corresponds to the third outer lateral wall with a gap existing in the middle session of the fifth inner lateral wall. The fourth inner lateral wall 34 and the fifth inner lateral wall 35 have protrusion points 341 and 351 which pivotally match with the pivotal holes 241 and 251 at the second outer lateral wall 24 and the third outer lateral wall 25 respectively. The upper casing 2 and the lower casing 3 will be coupled firmly preventing opposite rotating movement.

It is noteworthy that the gaps existing in the middle session of the second outer lateral wall 24 and the middle session of the fifth inner lateral wall 35 can be shifted to the middle session of the third outer lateral wall 25 and the fourth inner lateral wall in the opposite side. Apart from that, the pivotal holes 241 and 251 at the second outer lateral wall 24 and the third outer lateral wall 25 can he replaced with protrusion points, whereas the protrusion points 341 and 351 at the fourth inner lateral wall 34 and the fifth inner lateral wall 35 can be replaced with pivotal holes. Such a change still allows the second outer lateral wall 24 and the third outer lateral wall 25 to use their protrusion points to pivotally match with the pivotal holes at the fourth inner lateral wall 34 and the fifth inner lateral wall 35 to. The upper casing 2 and the lower casing 3 still can be coupled together when closed. The gaps existing in the middle session of the second outer lateral wall 24 and the middle session of the fifth inner lateral wall 35 help the user to disconnect the optical disk S from the central straddling 22 and 32.

The abovementioned first lateral wall 33, the second outer lateral wall 24 and its corresponding fourth inner lateral wall 34, the third outer lateral wall 25 and its corresponding fifth inner lateral wall 35 are all dustproof. To achieve a better dustproof effect: when the upper casing 2 is lacking a paper tray cover 23, the lower casing 3 can be equipped with a sixth lateral wall 39 opposite to a first lateral wall 33. Therefore, when the upper casing 2 is coupled to the lower casing 3, a complete dustproof effect can thus be achieved with the separation effect coming from the four lateral edges of the storage casing 1.

The upper casing 2 and lower casing 3 according to the invention include a first protective rib 26 and 36 which are situated in the same plane with the central straddling 22 and 32 respectively. The first protective rib 26 and 36, having an elevation of about 0.15 mm to 0.16 mm, are about 8 mm to 9 mm away from the central straddling 22 and 32 respectively. The upper casing 2 and lower casing 3 include a second protective rib 27 and 37 which are situated in the same plane with the first protective rib 26 and 36 respectively. The second protective rib 27 and 37, having an elevation of about 0.15 mm to 0.16 mm, are about 52 mm to 53 mm away from the central straddling 22 and 32 respectively. The first protective rib 26 and 36 as well as the second protective rib 27 and 37 provide the optical disk 5 protection for its base preventing the base of the optical disk 5 from contacting and rubbing with the storage casing 1, which would cause damage to the data stored on the optical disk 5.

The upper casing 2 and lower casing 3 include a third protective rib 28 and 38 which are situated at the same plane with the second protective rib 27 and 37 respectively. The third protective rib 28 and 38, having an elevation of about 0.15 mm to 0.16 mm, are about 53 mm to 55 mm away from the central straddling 22 and 32 respectively. The third protective rib 28 and 38 provide the optical disk 5 with protection for its top preventing the top of the optical disk 5 from being cracked or deformed as caused by pressure coming from above.

The upper casing 2 and lower casing 3 of the storage casing 1 according to the invention can be made of appropriate materials and with suitable colors: apart from prettifying its outlook appearance, it also prevents the optical disk from being exposed to sunshine directly which would damage the retention of data stored on the optical disk 5.

In short, the storage casing according to the invention achieves a dustproof effect and fastens the optical disk firmly through various lateral walls and sets of central straddling; prevents friction and rubbing through the first and the second protective ribs; gains the advantage of anti-pressure through the third protective rib; and furthermore, it allows space to accommodate advertisement paper. Therefore, the storage casing for two optical disks according to the invention achieves the purpose of reducing the thickness of the casing to about 5 mm to 5.5 mm without changing its original varied functions.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A slim storage casing for two optical disks, said storage casing including an upper casing and a lower casing assembled together, said storage casing forming a rotation axis around which said upper casing and said lower casing rotate to open and to close said storage casing, said storage casing characterized in that:

each of said upper casing and said lower casing comprising a respective molded central straddling, said central straddling comprising three flexible retaining holders, wherein each said flexible retaining holder is an L-shaped structure with a lying protruded session and a standing protruded session, wherein said lying protruded session extends along a radiating or an anti-radiating direction from said central straddling and is parallel to and connected to said upper casing or said lower casing, said flexible retaining holders at said upper casing not being symmetric to said flexible retaining holders at said lower casing with respect to said rotation axis, and said storage casing has a thickness of about 5 mm to 5.5 mm when said upper casing and said lower casing are closed.

2. The slim storage casing for two optical disks according to claim 1, wherein said standing protruded session of said L-shaped structure further comprises an outshoot situated atop said standing protruded session at a side thereof away from a center of said central straddling.

3. The slim storage casing for two optical disks according to claim 1, wherein said standing protruded session of said L-shaped structure is slanted and tilts in a direction away from a center of said central straddling.

4. The slim storage casing for two optical disks according to claim 3, wherein said standing protruded session of said L-shaped structure further comprises an outshoot situated atop said standing protruded session at a side thereof located away from a center of said central straddling.

5. The slim storage casing for two optical disks according to claim 1, wherein said central straddling further comprises three erected arced edges, a height of said erected arced edges is lower than a height of the erected arced edge of the said flexible retaining holder, and the arc length of said erected arced edges is longer than an arc length of said flexible retaining holder, and said central straddling alternates with the flexible retaining holders.

6. The slim storage casing for two optical disks according to claim 5, wherein said standing protruded session of said L-shaped structure further comprises an outshoot situated atop said standing protruded session at the side located away from a center of said central straddling.

7. The slim storage casing for two optical disks according to claim 5, wherein said standing protruded session of said L-shaped structure is slanted and tilts in the direction away from a center of said central straddling.

8. The slim storage casing for two optical disks according to claim 7, wherein said standing protruded session of said L-shaped structure further comprises an outshoot situated atop said standing protruded session at the side located away from the center.

9. The slim storage casing for two optical disks according to claim 5, wherein said erected arced edges at said upper casing include a first multi-overlapped sessions and said erected arced edges at said lower casing include a second multi-overlapped sessions respectively, and when said upper casing and said lower casing close together, said first multi-overlapped sessions are opposite to said erected arced edges at said lower casing and said second multi-overlapped sessions are opposite to said erected arced edges at said upper casing, and the height of said erected arced edges at said upper casing within said first multi-overlapped sessions is the same as a height of said flexible retaining holders and the height of said erected arced edges at said lower casing within said second multi-overlapped sessions is the same as a height of said flexible retaining holders.

10. The slim storage casing for two optical disks according to claim 9, wherein said standing protruded session of said L-shaped structure further comprises an outshoot situated atop said standing protruded session at the side located away from a center of said central straddling.

11. The slim storage casing for two optical disks according to claim 9, wherein said standing protruded session of said L-shaped structure is slanted and tilts in the direction away from a center of said central straddling.

12. The slim storage casing for two optical disks according to claim 11, wherein said standing protruded session of said L-shaped structure further comprises an outshoot situated atop said standing protruded session at the side located away from the center.

13. The slim storage casing for two optical disks according to claim 1, wherein at least one of said upper casing and said lower casing further respectively comprises a first protective rib situated in the same plane with the central straddling, said first protective rib, about 8 mm to 9 mm away from the central straddling, comprising an elevation of about 0.15 mm to 0.16 mm.

14. The slim storage casing for two optical disks according to claim 1, wherein at least one of said upper casing and said lower casing further respectively comprises a second protective rib situated in a same plane with said central straddling, said second protective rib, about 52 mm to 53 mm away from said central straddling, has an elevation of about 0.15 mm to 0.16 mm.

15. The slim storage casing for two optical disks according to claim 1, wherein at least one of said upper casing and said lower casing further respectively comprises a third protective rib situated in a same plane with said central straddling said third protective rib, being about 53 mm to 55 mm away from the central straddling, has an elevation of about 0.15 mm to 0.16 mm.

16. The slim storage casing for two optical disks according to claim 1, wherein said upper casing and said lower casing comprise opaque materials.

17. The slim storage casing for two optical disks according to claim 1, wherein said upper casing further comprises a U-shaped rear wall with two shorter edges and one longer edge, said shorter edge of said U-shaped rear wall comprises a pivotal hole and said longer edge of said U-shaped rear wall is parallel to said rotation axis.

18. The slim storage casing for two optical disks according to claim 1, further comprising a paper tray cover with two shorter edges and one longer edge, said shorter edge of said paper tray cover comprising a protrusion point pivotally matching with said pivotal bole at said U-shaped rear wall, said longer edge of said paper tray cover being parallel to said upper casing.

19. The slim storage casing for two optical disks according to claim 1, wherein said upper casing further comprises a dual protruded arm with a protrusion point pivotally matching with said pivotal hole at said shorter edge of said U-shaped rear wall.

20. The slim storage casing for two optical disks according to claim 1, wherein said upper casing or said lower casing further comprises a first lateral wall situated at the opposite side of said storage casing from said rotation axis, and the middle session of said first lateral wall is slightly concaved, whereby convenience of holding when the storage casing is to be opened is increased.

21. The slim storage casing for two optical disks according to claim 20, wherein a one of said upper or said lower casing, which lacks said first lateral wall, further comprises a second outer lateral wall and a third outer lateral wall perpendicular to said rotation axis, said second outer lateral wall and said third outer lateral wall both comprising a pivotal hole or a protrusion point, with a gap existing in the middle session of said second outer lateral wall for a finger to disconnect said optical disk from said central straddling.

22. The slim storage casing for two optical disks according to claim 20, wherein one of said upper or said lower casing, which includes said first lateral wall, further comprises a fourth inner lateral wall and a fifth inner lateral wall perpendicular to the rotation axis, said fourth inner lateral wall aligns to said second outer lateral wall and said fifth inner lateral wall aligns to said third outer lateral wall, with a gap existing in the middle session of said fifth inner lateral wall for a finger to disconnect said optical disk from said central straddling, said fourth inner lateral wall and said fifth inner lateral wall each comprising a protrusion point or a pivotal hole pivotally matching with the pivotal hole or the protrusion point at said second outer lateral wall and said third outer lateral wall respectively.

23. A slim storage casing for two optical disks, said storage casing including an upper casing and a lower casing assembled together, said storage casing forming a rotation axis around which said upper casing and said lower casing rotate to open and to close the storage casing, and is characterized in that:

each of said upper casing and said lower casing comprising a respective molded central straddling, said central straddling comprising three flexible retaining holders, wherein each said flexible retaining holder is an L-shaped structure with a lying protruded session and a standing protruded session, wherein said lying protruded session extends along a radiating or an anti-radiating direction from said central straddling and being parallel to and connected to said upper casing or said lower casing, said flexible retaining holders at said upper casing are not symmetric to said flexible retaining holders at said lower casing with respect to said rotation axis, said storage casing comprising a thickness of about 5 mm to 5.5 mm when said upper casing and said lower casing are closed; and wherein said central straddling further comprises three erected arced edges, a height of said erected arced edges is lower than that of said flexible retaining holder and a length of said erected arced edges is longer than that of said flexible retaining holder, said erected arced edges alternating with said flexible retaining holders.

24. The slim storage casing for two optical disks according to claim 23, wherein said standing protruded session of said L-shaped structure further comprises an outshoot situated atop said standing protruded session at the side located away from a center of said central straddling.

25. The slim storage casing for two optical disks according to claim 23, wherein said standing protruded session of said L-shaped structure is slanted and tilts in the direction away from a center of said central straddling.

26. The slim storage casing for two optical disks according to claim 23, wherein said standing protruded session of said L-shaped structure further comprises an outshoot situated atop said standing protruded session at the side located away from a center of said central straddling.

27. The slim storage casing for two optical disks according to claim 23, wherein said erected arced edges at said upper casing including respective first multi-overlapped sessions and said erected arced edges at said lower casing including respective second multi-overlapped sessions respectively, and when said upper casing and said lower casing close together, said first multi-overlapped sessions are opposite to said erected arced edges at said lower casing and said second multi-overlapped sessions are opposite to said erected arced edges at said upper casing, and the height of said erected arced edges at said upper casing within said first multi-overlapped sessions is the same as that of said flexible retaining holders and the height of said erected arced edges at said lower casing within said second multi-overlapped sessions is also the same as that of said flexible retaining holders.

28. The slim storage casing for two optical disks according to claim 23, wherein said upper casing and said lower casing further respectively comprises a first protective rib situated in a same plane with said central straddling, said first protective rib, being about 8 mm to 9 mm away from said central straddling, comprises an elevation of about 0.15 mm to 0.16 mm.

29. The slim storage casing for two optical disks according to claim 23, wherein said upper casing and said lower casing further respectively comprises a second protective rib situated in a same plane with said central straddling, said second protective rib, about 52 mm to 53 mm away from the central straddling, comprises an elevation of about 0.15 mm to 0.16 mm.

30. The slim storage casing for two optical disks according to claim 23, wherein said upper casing and said lower casing further respectively comprises a third protective rib situated at the same plane with said central straddling, said third protective rib, about 53 mm to 55 mm away from said central straddling, comprises an elevation of about 0.15 mm to 0.16 mm.

31. The slim storage casing for two optical disks according to claim 23, further comprising a paper tray cover with two shorter edges and one longer edge, said shorter edge of said paper tray cover comprising a protrusion point pivotally matching with said pivotal hole at said U-shaped rear wall, longer edge of said paper tray cover is parallel to said upper casing.

32. The slim storage casing for two optical disks according to claim 23, wherein said upper casing further comprises a dual protruded arm with a protrusion point pivotally matching with said pivotal hole at said shorter edge of said U-shaped rear wall.

33. The slim storage casing for two optical disks according to claim 23, wherein said upper casing further comprises a second outer lateral wall and a third outer lateral wall perpendicular to the rotation axis, a gap existing in the middle session of said second outer lateral wall for the finger to disconnect optical disk from said central straddling.

34. The slim storage casing for two optical disks according to claim 23, wherein said lower casing further comprises a fourth inner lateral wall and a fifth inner lateral wall perpendicular to said rotation axis, said fourth inner lateral wall aligns to said second outer lateral wail and said fifth inner lateral wall aligns to said third outer lateral wall, a gap existing in the middle session of said fifth inner lateral wall for the finger to disconnect optical disk from said central straddling.

* * * * *